Oct. 21, 1952 C. R. BACCA 2,615,103
ELECTRIC CONTROL FOR TRAILER BRAKES
Filed July 30, 1949 3 Sheets-Sheet 1

INVENTOR.
CHARLES R. BACCA
BY
Clarence B. DesJardins
HIS ATTORNEY

Oct. 21, 1952 — C. R. BACCA — 2,615,103
ELECTRIC CONTROL FOR TRAILER BRAKES
Filed July 30, 1949 — 3 Sheets-Sheet 2
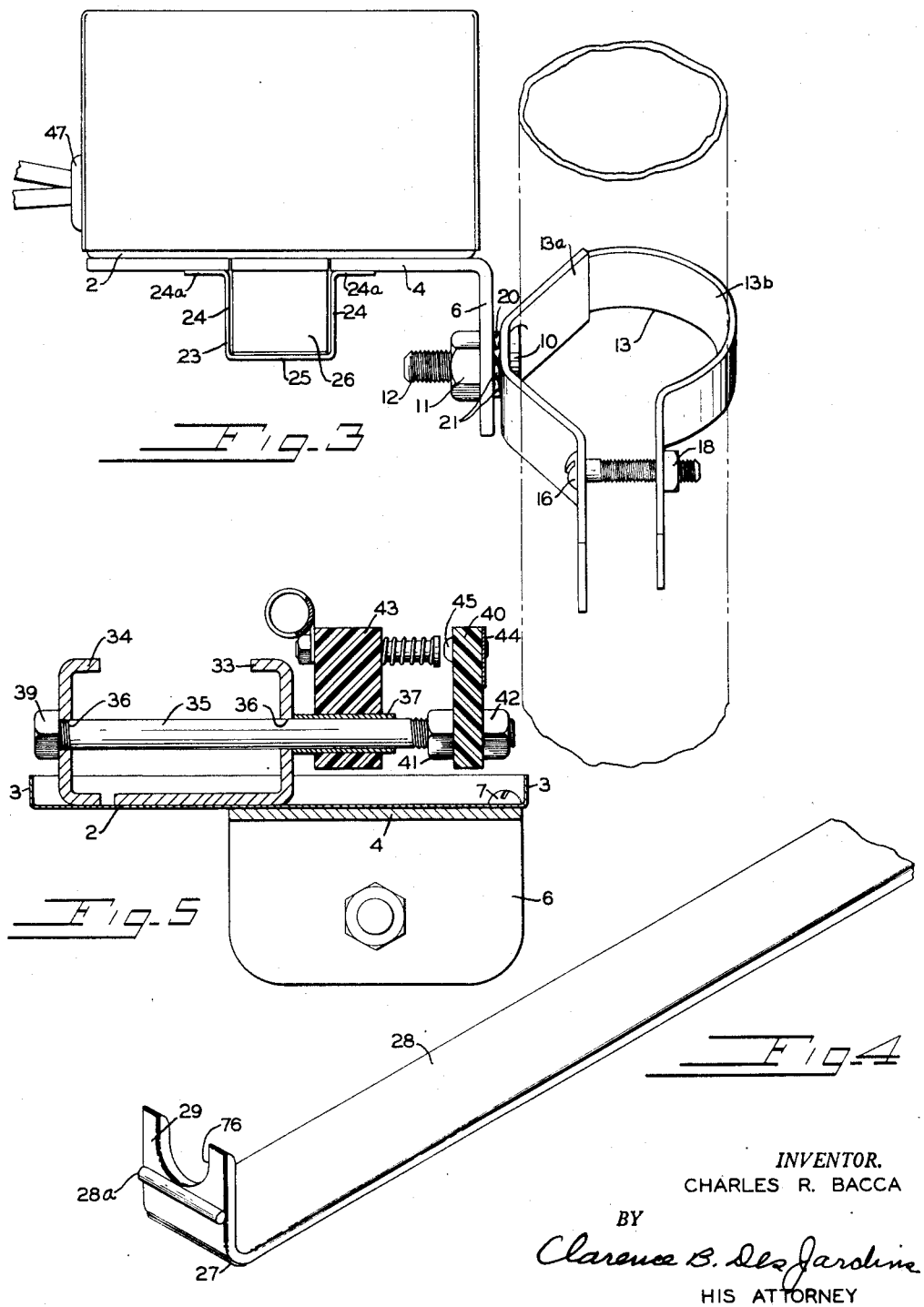
INVENTOR.
CHARLES R. BACCA
BY Clarence B. DesJardins
HIS ATTORNEY

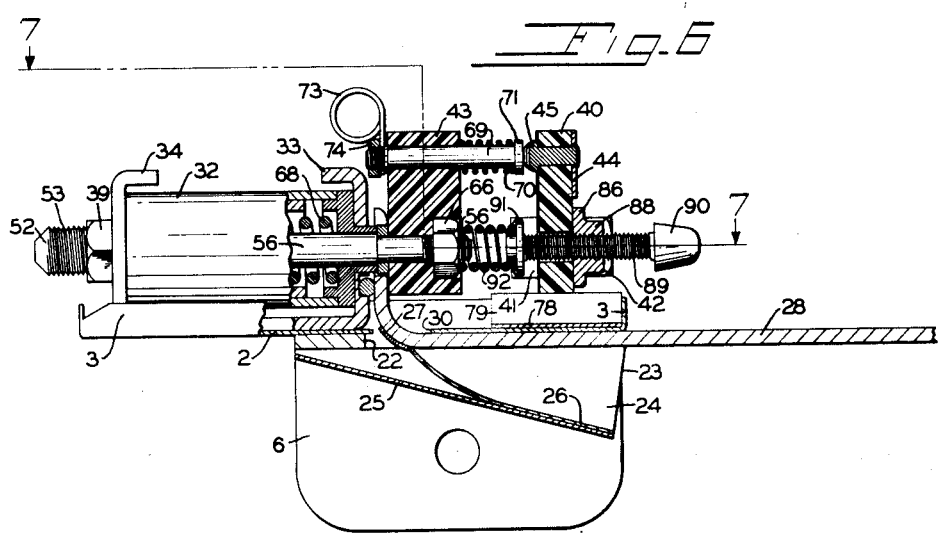
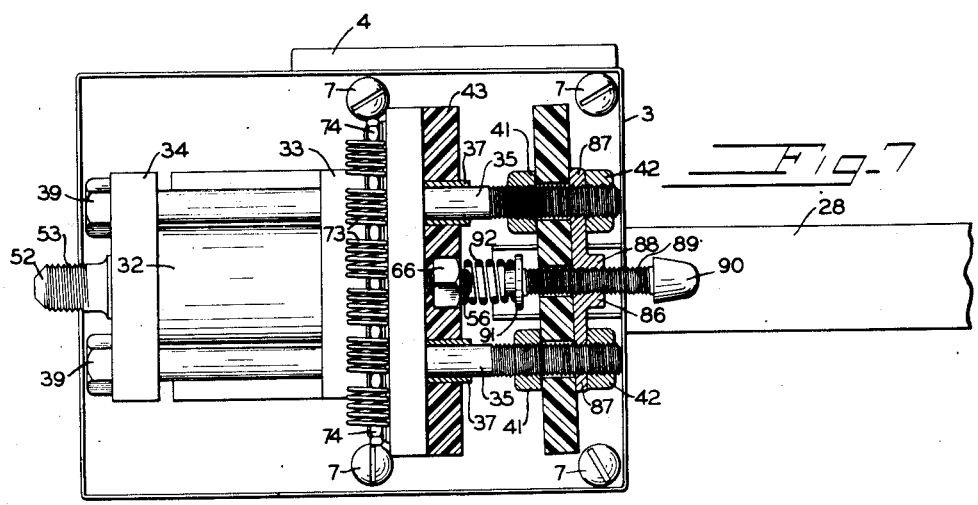

Patented Oct. 21, 1952

2,615,103

UNITED STATES PATENT OFFICE 2,615,103

ELECTRIC CONTROL FOR TRAILER BRAKES

Charles R. Bacca, Newtown, Ohio

Application July 30, 1949, Serial No. 107,703

18 Claims. (Cl. 200—82)

This invention relates to an electric control unit and it pertains more particularly to an electric control unit, including a rheostat, for use in a tractor-trailer vehicle combination for being connected with the hydraulic braking system of the tractor vehicle for operating the electrically operated brakes of the trailer vehicle concomitantly with the hydraulic brakes of the tractor vehicle. The control unit is also equipped with a manually operated emergency handle to permit operation of the trailer brakes independently of the tractor brakes.

The invention comprises a complete compact unit which is adapted to be mounted on the tractor for being connected to the hydraulic brake system of the tractor vehicle and wired to the electric braking system of the trailer vehicle to automatically operate the trailer brakes concomitantly with the tractor brakes. The tractor has a conventional emergency brake, manually operated, for operating its brakes independently of the foot pedal, and the control unit of the present invention is also provided with an emergency brake handle, manually operated, so that the trailer brakes may be operated independently of the foot pedal. The emergency brake handle is so connected with the control unit that it does not interfere with the hydraulic operation of said control unit, and accordingly the electric brakes of the vehicle may be operated automatically by the foot pedal hydraulically or manually by the emergency handle.

Since the control device is adapted for manual operation, it is installed in the tractor vehicle in a position for the handle to be readily accessible to the operator. Means is provided on the control unit so that it cannot only be installed in an accessible position for the operator, but can be readily adjusted in position to suit the convenience of a particular operator, and be readily removed if desired. One convenient place for mounting the control unit is on the steering column of the tractor vehicle, beneath the instrument panel, with a handle projecting toward the operator, the unit being pivotally attached to a holding strap that is disposed about the steering column. The holding strap permits the control device being fitted to any vehicle and adjustably positioned without any special fitting being required for different vehicles.

One of the objects of the invention is to provide a brake control unit for the trailer vehicle braking system which can be manually or hydraulically operated.

Another object of the invention is to provide a unit which can be readily attached in position to be connected to the tractor hydraulic brake system and be accessible to the operator.

Another object of the invention is to provide a unit in which the parts are easily adjusted for efficient operation.

Another object of the invention is to provide a unit which can be placed in a position to be readily adjusted to suit the convenience of any individual operator.

Another object of the invention is to wire the control into the stop light circuit of the tractor or trailer vehicle for quickly energizing the trailer brakes immediately upon operation of the foot brake pedal or handle.

Another object of the invention is to provide an accessory or supplementary spring and having means for adjusting the tension of the accessory or supplementary spring in relation to the trailer weight.

Another object of the invention is to have the adjusting means for the accessory or supplementary spring readily accessible.

Still another object of the invention is to provide a device which is simple in construction, efficient in operation, and can be easily installed and connected in the vehicle braking system.

Further objects and objects relating to details of construction and economies of operation, will appear from the detailed description to follow. In one instance, I have accomplished the objects of my invention by the device and means described in the following specification. My invention is clearly defined and pointed out in the appended claims, and a construction constituting a preferred embodiment of the invention is illustrated in the accompanying drawings, forming a part of the specification, in which:

Fig. 3 is a plan view of the control device mounted in position upon the steering column of a motor vehicle.

Fig. 4 is a perspective view of the manually operated handle for the device.

Fig. 5 is a longitudinal cross sectional view taken on between one of the bracket clamp bolts or rods and the cylinder member of Fig. 1.

Fig. 6 is a side elevation, partly in cross section, of the invention.

Fig. 7 is a top view taken on lines 7—7 of Fig. 6.

Figure 1:
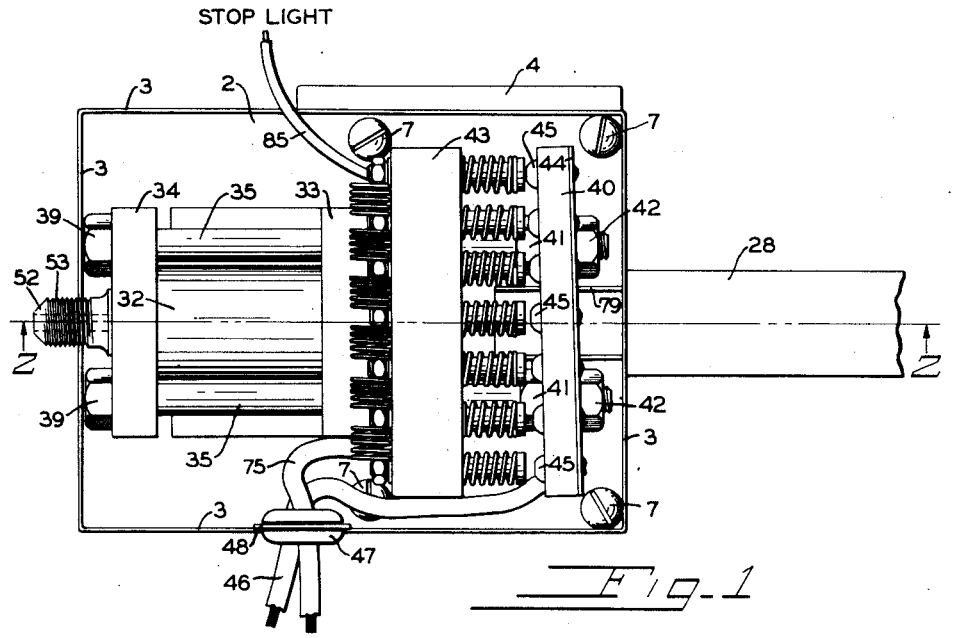
Fig. 1 is a top plan view of a device embodying the invention with the cover removed.
Figure 2:
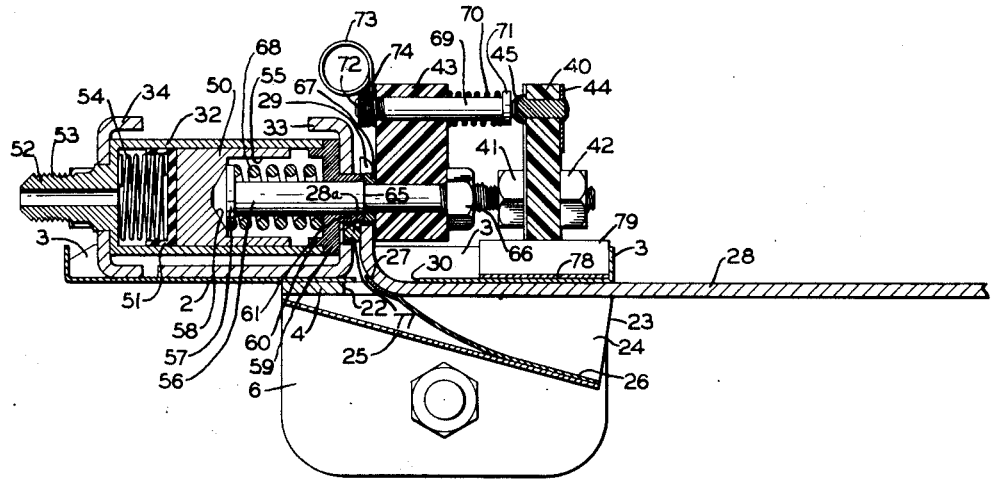
Fig. 2 is a cross sectional view on line 2—2 of Fig. 1.

Referring specifically to the drawings, in which like numerals are used to designate like parts, numeral 2 designates a sheet metal bottom with its edges bent into outstanding flanges 3 on which is seated a cover (not shown) for forming a box or container for enclosing the hereinafter described control unit and its operating mechanism. Any number of embossments (not shown) may be stamped from the side and end walls of the cover for engaging with similar embossments stamped from the flanges 3 of the bottom member. The engaging embossments typify any suitable means whereby the cover may be readily attached to and detached from the bottom member. The bottom of the box is attached to the base 4 of an angle bracket, having an arm 6 at one end, by suitable fastening means, such as screws 7. The arm of the angle bracket is bent at a right angle to the base 4 and perforated for receiving a bolt 10, with a clamp nut 11 on its threaded end 12, to which is pivotally connected a metal strap 13 of substantial length, the strap being perforated to receive the bolt 10. One end of the strap is perforated to receive a bolt 16 which is projected therethrough and through anyone of a series of spaced-apart perforations on the opposite end of the strap. One part 13a of the strip, which is more or less rigid, is bent to form a channel on one side for seating against the side of the steering column of the tractor vehicle and providing ample space for clearance of the head or bolt 10. The other part 13b of the strap is flexible and has one end welded to part 13a, and its opposite end, provided with the series of perforations, is bent around the steering column and clamped thereto by the bolt 16 and the nut 18 which is screw-threaded thereon. A lock washer 20, with tangs or bite portions 21 thereon, is interposed between the part 13a of the strap and the angle bracket so that the pivot bolt may tightly clamp to lock the pivoted parts together in any adjusted angular position. The base 4 of the angle bracket is slotted medially at 22, in from one end and parallel to the arm 6, and a channel member 23, with sidewalls 24 and inclined backwall 25, is attached to the base of the angle bracket, as by welding, with the open side of the channel in the channel member aligning with the slot 22 in the angle bracket.

To facilitate attachment of the channel member to the angle bracket, the sidewalls are provided with feet 24a which are formed by bending the ends of the sidewalls 24. One end of a leaf spring 26 is welded to the inclined backwall 25 of the channel member 23 with the free end of the spring disposed to impinge against an abutment 27 on the heel of a handle 28 which has an intermediate portion fitting in the slot 22 with its flanged end 29 projecting through a slot 30 in the bottom member 2 and its opposite end extending beyond the mouth of the channel member for a sufficient length to be grasped by the operator for a manual operation of the control device to operate the trailer brakes. A portion of the bottom member 2 closes the open side of the channel member when the bottom member and the angle bracket are fitted together. A strip 28a is welded to the flanged end 29 for seating in the recess of the bracket 33 beneath the hub portion of the cap member 59.

The ends of a cylinder member 32 are clamped between spaced-apart brackets 33 and 34 by a pair of rods or bolts 35 which extend through perforations 36 in the brackets. The bolts have enlarged portions 37, intermediately of their ends, fixed thereto for having their ends bear against bracket 33 and be clamped thereagainst by nuts 39 on the opposite ends of the bolts. The enlarged portions may be integral with the bolts or be sleeves or collars secured thereto as by welding. The brackets 33 and 34 are provided with the respective top and bottom flanges, and the bottom flanges of at least one of the brackets is secured to the bottom member 3, as by welding. The opposite ends of the bolts extend a substantial distance beyond bracket 33 and have one of the switch parts adjustably mounted thereon. This switch part is preferably the insulating plate 40 which is perforated for receiving the ends of the bolts and being clamped thereon between nuts 41 and 42 that are screw-threaded to the ends of the bolts. Accordingly, the insulating plate may be readily adjusted in proper spaced relation from the other part 43 of the switch. The insulating plate 40 carries a metal contact plate 44 having a series of contact points 45 extending through the insulating plate in position to register with a series of contacting members on the switch part 43. The insulating plate 40 is inclined at a slight angle to the part 43, to be non-parallel, so that contact between the switch points will be made and broken progressively when one of the switch parts is moved relatively to the other longitudinally of the bolts. This angular disposition of the insulating plate 40 is readily effected to nicety of adjustment by means of the clamp nuts 41 and 42. The contact plate 40 is wired at 46 to the vehicle battery, the wire passing through a perforated rubber grommet 47 that is mounted in a cleat 48 on the flange of the bottom member 3. The cover will be cut out to provide a clearance for the grommet.

A piston 50 is fitted to slide within the chamber of the cylinder and has a conventional flexible cup shaped member 51, preferably of ruberized fabric, fitted to seat against the head of the piston. There is an inlet nozzle 52, screw-threaded at 53, to which is attached the end of a conduit leading to the hydraulic brake system of the tractor. A coil spring 54 is interposed between the inlet end of the cylinder chamber and the cup shaped sealing member for pressing the sealing member against the end of the piston. The opposite end of the piston has a socket 55 for receiving the end of a rod 56 whose head 57 seats in a recess 58 formed in the bottom wall of the socket. The end of the chamber is closed by a cap member 59 having a flanged portion 60 for seating in the end of the cylinder and a hub portion with an extended neck 61 for seating in the bracket. The cap member is secured in place when fitted in position and clamped, with the cylinder, between the brackets. The end of the neck portion servies as a stop to limit the movement of the bolt in one direction. The switch part 43, also of insulating material, is perforated to receive the reduced end of the rod 56 and be clamped between the shoulder 65 and the nut 66 on the end of the rod. A spacing washer 67 may be interposed between the insulating plate and the neck of the cap member to seat against the shoulder and extend radially to abut against the neck of the cap member. A coil spring 68 is disposed about the rod 56 with one end thereof seated against the head 57 of the rod and its other end seated against the cap member 59. The spring is slightly compressed by clamping the plate member 40 in position against the shoulder, or the spacing washer, to serve at all times to return the plate to normal position, out of contact with plate 40, with the switch open.

A series of contact members 69 are mounted on the holder plate 43 and these are projected through the holder plate for free sliding movement therein. A coil compression spring 70 surrounds each of the contact members with one end of the spring seated against the side of the holder plate and the opposite end seated against the head 71 on the contact member. The springs are under compression to hold the heads 72 on the opposite ends of the contact member, against the opposite side of the holder plate. There is a resistant coil 73 between each of the adjacent contact members, and these are preferably in a continuous wire so that there will be less chance of any loose connection with the contact members than if separate wires were used. However, this is not essential, as the resistant wires between the adjacent contact members may be separate from those between adjacent members. The resistant wire or wires is functionally continuous and preferably are structurally continuous. The head 71 of the contact members include a nut 74 so that the resistant wire coils may be readily clamped to the heads.

The end contact member of the series is wired at 75 to the brakes of the trailer, the wire being passed through the single grommet with the wire connection from the other switch leading to the battery. Thus the electric circuit of the electric brake system is closed when the switch parts of the control are moved in contact.

The flanged end of the handle is bifurcated by slot 76 so that the bifurcated end may straddle the neck of the cylinder cap and the spacing washer and be interposed between the holder plate 43 and the adjacent bracket. The piece 28a is welded to the flange of the handle in position to seat in a recess 77 in the bracket beneath the cap member. The handle can be operated to apply the trailer brakes by having its free end pushed downwardly. The bifurcated end will engage the side of the holder plate 43 to move it and the rod against the resistance of the spring toward the contact plate 40 for making contact to operate the trailer brakes. The piece 28a provides a pivot for the handle and serves to hold the handle in assembled relation. The leaf spring, bearing against the heel of the handle, will prevent the handle getting out of place. Spring 68 is normally under tension, and returns the bolt and the plate carried thereby, to normal position when the foot pedal or emergency handle is released.

The back of a channel member 78 is welded to the bottom member 3 with its sidewalls 79 projecting upwardly to provide a support for the bottom of the insulating plate as this helps to steady the plate 40 although it is firmly mounted on and clamped to the bolts.

In order that the trailer brakes may be effective immediately upon operation of the tractor brakes without any time delay or lost motion, the first contact member, the first of the series of members 69 to function when the plate 43 is moved, is wired at 85 to the stop light circuit of the tractor or trailer vehicle. Accordingly, braking action will be immediately applied to the trailer brakes as soon as plate 43 moves, even before this first contact member of the series of contacts 69 has moved sufficiently far for it to make contact with the contact point on the plate 40. This feature is important in effecting energization of the trailer brakes immediately upon application of the brake pedal and before the circuit of the control device is closed by the control switch.

The embodiment in Figs. 6 and 7 shows an accessory and supplementary tensioning device for resisting movement of the plate 43, and is a control for load limit. With heavy trailers, greater braking action is required than with light trailers, and accordingly, the control device may have the spring 56 of a standard or predetermined tension adapting it for the heaviest weight trailers which are to be used. Then the accessory tensioning means for resisting movement of plate 43 can be used or not, as may be found necessary, and can be adjusted to regulate the increased degree of resistance of the plate 43 against the emergency brake handle or the pressure actuated piston of the control device, especially for light weight trailers.

This accessory or supplementary adjustable device for load limit comprises a yoke 86 having perforated ears 87 through which the ends of bolts 35 extend for clamping the yoke against plate 40 between the clamp nuts 41 and 42. A central hub portion 88 of the yoke is bored with the wall of the bore screw threaded for having a rod member 89 screw-threadedly connected to the yoke, the plate 40 being recessed in registration with the bore of the yoke to allow the rod to project therethrough. The diameter of the recess in 40 will be larger than the rod to allow ample clearance. The rod has a knob 90 on its outer end so that it can be turned easily by hand, and a collar 91 is fixed to its opposite end for seating one end of a spring 92 which is interposed between the collar and the plate 43. The end of the bolt 56 to which the plate 43 is clamped will project into the end of the spring 92 to hold it in place against the plate. The nut 60 on the end of the bolt 56 is preferably countersunk in the plate 43 as this gives increased space for the spring 92. This device permits ready adjustment for tensioning the spring 92 for determining its degree of resistance to the movement of the plate 43 in addition to the resistance of spring 68. The switch control unit may be used with or without this accessory or supplementary load limit adjustable device.

From the foregoing description the operation of the device is obvious. When the foot pedal brake of the tractor vehicle is depressed, the pressure from the hydraulic brake system to which the cylinder is connected will actuate the piston, against the resistance of the spring 68, within the cylinder to move the contact members carried by the holder plate 43 which is attached to the rod 56, progressively in contact with the points on the contact plate on the holder plate 40. When pressure on the foot pedal is released, the spring will move the contact members to the limit stop position out of contact with the contact plate. The switch may be manually operated by depressing the emergency handle lever of the control unit so that its flanged bifurcated end will move the holder plate and likewise compress the coil spring so that the spring will return the plate to normal limited stop position upon release of the handle. Accordingly, the device can be operated either with the foot brake or manually by the emergency handle lever.

By the inclination of the plate 40 at an angle to the plate 43, as shown in Fig. 1, the points of the switch parts will be progressively moved in and out of contact when the plate 43 is moved relatively to plate 40. When the first contact is made in closing the switch, the electrical resistance will pass through all of the resistance coils. As subsequent contacts are progressively made, the resistance through the coils is correspondingly reduced and the electrical energy correspondingly increased.

This invention is an improvement upon the construction in my Patent No. 2,551,523, issued May 1, 1951.

I am aware that the device shown herein may be varied considerably, and, therefore, I claim my invention broadly as indicated by the appended claims.

Having thus described my invention, what I claim as new and useful and desire to secure by United States Letters Patent, is:

1. A control device comprising a casing having a chamber formed therein, a member movable within the chamber, means actuated by said member and carrying part of a switch mechanism, another part of the switch mechanism mounted in the path of the movable part of the switch mechanism, said switch mechanism carrying a plurality of contact parts which are positioned to make and break contact progressively upon movement of the movable switch part, spring means for holding the movable switch part normally out of contact with the other switch part, means connected to the chamber providing for actuating within the casing the movable member and also for actuating that means carrying the movable switch part, and a handle for actuating the movable switch part against the resistance of the spring independently of the other actuating means for said movable switch part.

2. A control device as set forth in claim 1 in which the means connected to the chamber is an inlet conduit for hydraulically operating the movable member within said chamber.

3. A control device comprising a cylinder having a chamber formed therein, a piston reciprocable within the chamber, a rod carrying a holder upon which a switch part is mounted comprising a series of contacting points, said rod being mounted in position to be actuated by the piston, another switch part adjustably mounted adjacent to the first mentioned switch part, a spring for holding the movable switch part, and handle means for actuating the movable switch part independently of the piston.

4. A control device comprising a chamber having a pressure operated member movable therein, a rod operated by the pressure operating means carrying a part of a voltage control switch, another part of the voltage control switch mounted on a device in the path of the voltage control switch which is carried by the rod, a spring for normally holding the voltage control switch parts out of contact, means for applying pressure to the pressure operated member against the force of the spring, and a manually operated handle pivoted to the device for operating the movable part of the voltage control switch against the force of the spring independently of the pressure operated means.

5. A control device as set forth in claim 4 in which the handle is loosely pivoted to the device, and there is a means for holding the handle in pivoted position.

6. A control device as set forth in claim 5 having a means for clamping said device to the steering column of the vehicle.

7. A control device as set forth in claim 6 in which the clamping means is pivotally connected to the device.

8. A control device comprising a cylinder having a chamber in which a pressure operated member is movable, a rod operated by the pressure operated means carrying a part of a voltage control switch, another part of the voltage control switch mounted in the path of the voltage control switch which is carried by the rod, a spring for normally holding the voltage control switch parts out of contact, means for applying pressure to the pressure operated member against the force of the spring, a plate on which the device is mounted, and a handle having one end projecting through a recess in the plate for moving the part of the voltage control switch which is on the rod.

9. A control device as set forth in claim 8 in which there is a wall member surrounding the recess in the plate.

10. A control device as set forth in claim 9 in which there is a spring inserted between the surrounding wall member and the handle for holding the handle in place.

11. A circuit control device comprising a contact plate member adapted to be connected in an electrical circuit, a support member carrying a series of contact points disposed adjacent said plate member for progressively contacting therewith, means for yieldably holding one of said members normally out of contact with the other member, a supplementary means for yieldably holding said member out of contact, and adjustable means mounted on one of said members for regulating the tension of the supplementary yieldable holding means.

12. A circuit control device comprising a contact plate member adapted to be connected to an electrical circuit, a support member carrying a series of contact points disposed adjacent said plate member, means for movably mounting one of said members in respect to the other member, a spring means for normally holding the movable member out of contact with the other member, supplementary spring means for resisting movement of the movable member, and means mounted on one of said members for adjusting the tension of the supplementary spring means.

13. A circuit control device comprising a cylinder mounted in a support, an outlet conduit in one end of the cylinder for connecting said cylinder to an hydraulic system, a piston reciprocally mounted in said cylinder, a movable rod carrying a switch part and disposed to be actuated by the piston, a switch part disposed to be contacted by the movable switch part, a spring for normally holding the movable switch part out of contact with the other switch part, means for adjusting the tension of the spring, and a handle for actuating the movable switch part independently of the piston.

14. A circuit control comprising a cylinder mounted in a support, an inlet conduit in one end of the cylinder for connecting said cylinder to an hydraulic system, a piston reciprocally mounted in said cylinder, a movable rod carrying a switch part and disposed to be actuated by the piston, a switch part disposed to be contacted by the movable switch part, a spring for normally holding the movable switch part out of contact with the other switch part, a supplementary spring for resisting movement of the movable switch part, and means for adjusting the tension of the supplementary spring.

15. A circuit control comprising a cylinder mounted in a support, an inlet conduit in one end of the cylinder for connecting said cylinder to an hydraulic system, a piston reciprocably mounted in said cylinder, a movable rod carrying a switch part and disposed to be actuated by the piston, a switch part disposed to be contacted by the movable switch part, means for adjusting one of the switch parts, a spring interposed between the switch parts for resisting movement of the movable switch part, and means for adjusting the tension of the spring.

16. A circuit control as set forth in claim 15 in which the switch parts have a series of progressive contact points.

17. A circuit control device comprising a contact plate member adapted to be connected to an electrical circuit, a support member carrying a series of contact points disposed adjacent said plate member, means for movably mounting one of said members in respect to the other member, a spring means for normally holding the movable member out of contact with the other member, supplementary spring means for resisting movement of the movable member, means for adjusting the tension of the supplementary spring member, and a handle for actuating said movable member.

18. The circuit control device of claim 17 including a fluid pressure operated device for also actuating said movable member.

CHARLES R. BACCA.

REFERENCES CITED

The following references are of record in the file of this patent:

UNITED STATES PATENTS

| Number | Name | Date |
|---|---|---|
| 733,562 | Sundh | July 14, 1903 |
| 1,786,534 | Hale | Dec. 30, 1930 |
| 1,807,280 | Carpenter | May 26, 1931 |
| 1,937,458 | Armstrong | Nov. 28, 1933 |
| 1,951,882 | Pentecost | Mar. 20, 1934 |
| 1,952,679 | Leveen | Mar. 27, 1934 |
| 2,158,175 | Coppola et al. | May 16, 1939 |
| 2,228,631 | Kuiper | Jan. 14, 1941 |
| 2,276,028 | Dick | Mar. 10, 1942 |
| 2,355,872 | Kronmiller | Aug. 15, 1944 |
| 2,355,975 | Henrici | Aug. 15, 1944 |
| 2,407,509 | Oetzel | Sept. 10, 1946 |

FOREIGN PATENTS

| Number | Country | Date |
|---|---|---|
| 884,035 | France | Apr. 12, 1943 |